United States Patent [19]

Morse et al.

[11] 3,843,010

[45] Oct. 22, 1974

[54] METAL LINED PRESSURE VESSEL

[75] Inventors: William George Morse; Thomas Edward Timberlake, both of Lincoln, Nebr.

[73] Assignee: Brunswick Corporation, Skokie, Ill.

[22] Filed: Oct. 13, 1971

[21] Appl. No.: 188,862

[52] U.S. Cl. .................................. 220/3, 220/39 R
[51] Int. Cl. .................................................. F25j
[58] Field of Search .......... 220/3, 39 R, 83; 138/26, 138/30

[56] References Cited
UNITED STATES PATENTS

| 2,120,057 | 6/1938 | Merrill | 220/3 |
| 2,450,173 | 9/1948 | Uhri | 220/39 R |
| 3,240,644 | 3/1966 | Wolff | 220/3 |
| 3,321,347 | 5/1967 | Price et al. | 220/3 |
| 3,334,780 | 8/1967 | Van Leer et al. | 220/3 |

*Primary Examiner*—George E. Lowrance
*Assistant Examiner*—Steven M. Pollard

[57] ABSTRACT

A lightweight, high strength composite substantially all metal-lined pressure vessel is made by reinforcing the liner with an overwrap of resin impregnated filamentary material. End caps or polar boss fittings are attached to the vessel by means of a biasable seal. The pressure vessel is substantially free of failure forming stress concentrations and is substantially impermeable to the fluids stored therein. The vessel is capable of withstanding repeated pressurization-depressurization.

9 Claims, 3 Drawing Figures

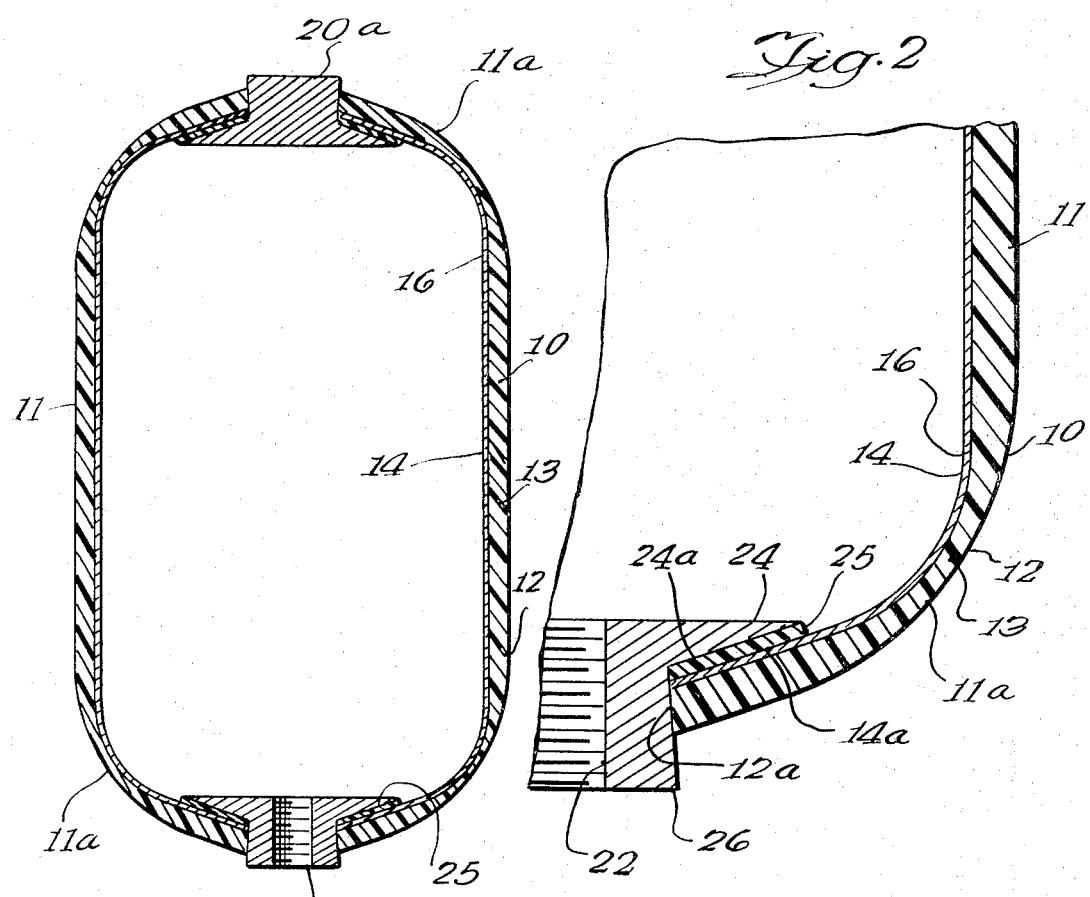
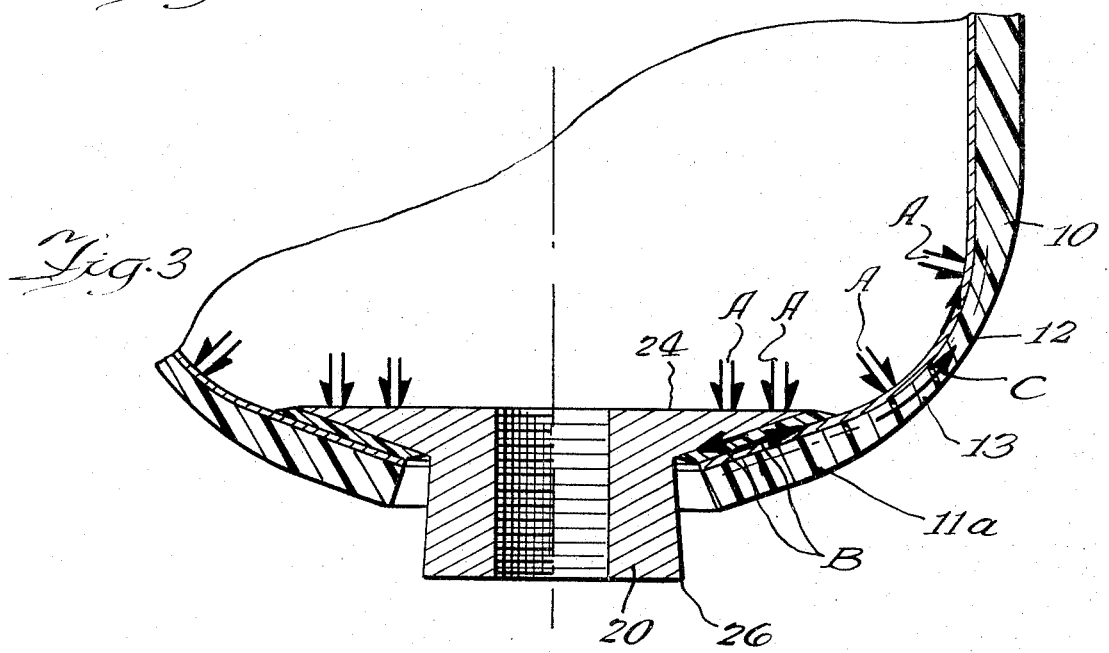

METAL LINED PRESSURE VESSEL

FIELD OF THE INVENTION

This invention is in the field of pressure vessels, and more particularly, in the field of pressure vessels capable of storing fluids under extreme pressures without significant leakage.

BACKGROUND OF THE INVENTION

Pressure vessels come in all sizes and shapes, and are made from a variety of materials. These vessels may be light or heavy in weight, throw-aways, reusable, subjected to low pressures (as used hereinafter to mean pressures less than 50 psi) and/or high pressures (greater than low pressures) and used for storing all types of fluids (gases and/or liquids) at ambient, elevated or cryogenic temperatures. The need for lightweight pressure vessels has existed and still exists for both military and commercial applications. Many attempts have been made to make lightweight pressure vessels that are capable of satisfying the needs and criteria of (1) storing fluids under high pressures for long periods of time, (2) being non-shatterable when rapidly punctured by external forces while pressurized, (3) sustaining repeated pressurization and depressurization, (4) being substantially impermeable to the fluids stored therein, (5) having a low weight to volume times pressure ratio and (6) being easy to manufacture and thereby being economical for the desired use.

It has long been acknowledged that resin impregnated fiberglass filament wound pressure vessels are capable of withstanding high pressures at weight to volume times pressure ratios considerably less than all metal pressure vessels. However, these solely filament wound pressure vessels have proven to be too porous to satisfy the criteria listed above. One commonplace approach to solve the porosity problem of the filament wound pressure vessels has been suggested by using elastomeric, thermoplastic or metal liners. Many U.S. Letters Patents have been granted that attempt to teach such a solution. Yet, in the final analysis, all the criteria listed above have not been met by the teachings of these patents.

Metal lined pressure vessels have the characteristics of being completely impermeable or non-permeable to all fluids when the proper metal liner is selected with respect to the fluids being stored therein. One satisfactory all metal lined pressure vessel that meets the above criteria has been taught in application for U.S. Letters Patent, Ser. No. 144,351, filed May 17, 1971, and owned by the assignee hereof.

Thermoplastic, elastomeric or rubber liners of a filament wound pressure vessel are not impermeable to the fluids stored therein as are fully metal lined pressure vessels and therefore such vessels leak over a period of time. These non-metal liners do not contain pores or holes but the characteristics of the liner materials are such that the molecules of the fluids "pass through" or permeate the material.

Certain factors effect the leakage rate of a non-metal liner of pressure vessel; to wit:

1. the pressure differential across the liner material;
2. the permeability characteristics for the specific liner material respecting a specific fluid;
3. the temperature of the inside of the pressure vessel; and
4. the geometry of the liner.

Under one set of temperature and pressure conditions the leakage rate for a specific fluid through a specific liner material may be approximately 1% or less over a 5 year period; then, the liner material can be regarded as impermeable to the fluid. However, the leakage rate may be drastically altered by a change in the temperature, the pressure differential across the liner and/or the fluid stored therein.

In a pressure vessel with a non-metallic liner the leakage rate, after achieving equilibrium, determines the storage life of a vessel. This leakage rate is expressed by the following formula:

$$L_r = K \times \Delta P \times G$$

wherein $L_r$ is the leakage rate; $K$ is a coefficient that is determined by the temperature inside the vessel, the specific fluid (gas or liquid) characteristics with respect to the permeation characteristics of the liner material; $\Delta P$ is the pressure differential across the liner from the inside to the outside thereof; and $G$ is the geometric factor determined by the surface area (A) of the liner exposed to the fluid divided by the thickness ($t$) of the liner.

As discussed and in application for U.S. Letters Patent Ser. No. 144,351, a thin metal liner has distinct advantages over the non-metal lined pressure vessel from a permeability standpoint. However, other than the metal lined vessel of Ser. No. 144,351, cyclic fatigue caused by repeated pressurization and depressurization prematurely destroys the pressure vessel. On the other hand, the non-metal lined pressure vessels of the prior art are subjected to high leakage rates at high pressures primarily because the geometric factor is high—the large surface area and relative thinness of the liner.

Therefore, a solution to the problem of providing a metal lined pressure vessel that is substantially free of strain or stress magnifications and therefore less susceptible to fatigue failure and yet substantially impermeable to fluid contained therein has hitherto remained unsolved.

SUMMARY OF THE INVENTION

The pressure vessel disclosed herein provides a new and novel pressure vessel that satisfies the criteria that has not been achieved by the prior art. Such a pressure vessel has an inner metal liner surrounded by one or more outer resin impregnated filamentary forming reinforcing layers. The vessel has one or more end caps or bosses at its polar domes to permit the ingress or egress of the fluid as desired. The boss can be made of the same or different material as that of the liner. The vessel housing has an opening provided so that a flange portion of the boss is inside the vessel and adjacent the inner metal liner. A biasable seal means is adjacent both the flange and the metal liner providing a seal for the vessel.

It is an object of this invention to provide a lightweight filament wound pressure vessel with a thin metal liner substantially covering all the interior of the vessel and capable of containing fluids and operating under repeated pressurization and depressurization.

Another object of this invention is to provide such a pressure vessel that will operate under conditions where the metal liner is continually subjected to pressurization and depressurization wherein the elastic limit of the metal liner is continually exceeded.

Still another object of this invention is to provide a pressure vessel where the metal liner is made from a different material than the boss.

A feature of this invention is the provision for an elastomeric bias means that is secure to the interface between the flange of the boss and the metal liner providing a seal therebetween.

Another feature of this invention is the provision that the entire metal liner surface be bonded to the reinforcing layer in a fashion to eliminate any buckling in the metal liner when the liner has been plastically deformed.

Still another feature of this invention is the provision that such an elastomeric bias means acts as an elastic shear plane between the flange of the boss and the metal liner thereby drastically reducing the stress or strain magnification at the boss-liner interface.

The invention broadly contemplates a pressure vessel with a thin metal liner overwrapped by resin impregnated longitudinal and circumferential filament wound structural outerlayer both of which comprise a housing. The housing has one or more openings adapted to receive a flanged boss at each opening. The flange of the boss is secured to the metal inner liner by a bias means that both seals the vessel and provides for relative movement of the housing with respect to the boss during pressurization and depressurization of the vessel. The bias means comprises an elastomeric material that although permeable to fluids comprises so little internal surface area of the vessel and such a relatively long permeation path that the leakage rate is negligible.

The above and other and further objects and features will be more readily understood by reference to the following detailed description and the accompanying drawings.

DESCRIPTION OF THE DRAWINGS

FIG. 1 is a cross-sectional view of a pressure vessel embodiment of the invention with one open end cap and one sealed end cap;

FIG. 2 is a segmented enlarged cross-sectional view one portion of the pressure vessel of FIG. 1; and FIG. 3 is a segmented enlarged cross-sectional view of the same portion of the pressure vessel as FIG. 2 except that the vessel is in a pressurized mode.

DESCRIPTION OF THE PREFERRED EMBODIMENTS

This invention contemplates providing a lightweight pressure vessel that is capable of operating at repeated pressurizations and depressurizations and is substantially impermeable (leak proof) to the fluid stored therein. These pressure vessels generally have a cyclic life (pressurization-depressurization — one cycle) ranging from 10 to 1,000,000 cycles depending on the operating pressures which generally range from 0 psi to 1500 psi and from 0 psi to 10,000 psi. It will be obvious to those skilled in the art that such vessels will also operate satisfactorily under less stringent conditions.

In a preferred embodiment of the invention depicted in FIG. 1, the pressure vessel 10 has a generally cylindrical shaped center section 11 and polar caps or domes 11a. Alternatively, the pressure vessel may have no cylindrical section, if desired. The section 11 and the domes 11a comprise the unitary composite housing 12 of the vessel 10. The housing 12 includes at least one metal inner liner layer 14 surrounded by at least one outer layer 13. The outer layer is made from resin impregnated fiberglass and can be either filament wound, fabric layup or a combination of both. The filament winding can be longitudinal or circumferential, or a combination of both, as desired. The layer 13 can be a single layer or multiple layers depending on the size filaments used and strength desired. The methods of filament winding and/or fabric layup are well known in the art. The use of slip-planes (not shown) and method of providing slip-planes at dome-cylinder junction, when multiple layers 13 are used, is taught in application for U.S. Letters Patent Ser. No. 144,351 and the total teaching contained therein is fully incorporated herein by reference. The metal liner can be made from any desired metal including steel, aluminum, nickel, titanium, platinum, gold, silver, the alloys thereof, and stainless steel, but is not limited thereto. These metals can generally be characterized as having a high modulus of elasticity, generally 10 million psi or greater, and a low elastic strain generally ranging from about 0.05% to about 1%. Since the metal liner is generally thin, its primary purpose is as an inert container for the fluid stored therein. Since such pressure vessels are generally but not always pressurized to a degree wherein the elastic strain limit of the metal of the liner is exceeded, the metal liner 14 will fail if it is not reinforced by the outer layer 13.

The outer layer 13 is made from materials including filaments or fibers of glass, metal, carbon, graphite, boron, synthetics, in roving or fabric form, but not limited thereto. The roving or fabric is impregnated with resinous materials including epoxies, polyamides, polyimides, polyesters, polyoelfins, silicones, polyurethanes, combinations thereof, but not limited thereto. The outer layer 13 should generally have a higher elastic strain limit than that of the metal liner material. This elastic strain limit ranges from about .4% to about 3.5% with the preferable range from about 1% to about 3%. For example, when the metal liner 14 is made from aluminum (or its alloy) having an elastic strain limit of about .35% then it is desirable that the outer layer 13, which is bonded to the metal liner 14, has an elastic strain limit designed to operate at about .84%. Thus, the composite housing 12 can be designed to have a preselected elastic strain limit so that the metal liner 14 can withstand, without failure, required repeated cyclic pressurizations and depressurizations even though the elastic strain limit of the liner 14 is repeatedly exceeded.

To complete the pressure vessel 10, end caps or bosses 20 and 20a are attached to the open ends 12a of the housing 12. The boss 20 has a semi-cylindrical upper portion 26, a flange portion 24 and a passage 22 with means for attaching outer fittings (not shown) to the vessel 10. The upper flange surface 24 a generally conforms to the contour of the upper dome portion of the inner surface 14a of the metal liner 14. The flange surface 24a is positioned adjacent the liner surface 14a near the opening 12a in the housing 12. The boss 20 is secured to liner 14 by means of bonding a biasable interface layer 25 to the flange surface 24a and the liner surface 14a and concomitantly acts to seal the vessel 10. The boss 20a is attached to the liner 14 in the same manner as the boss 20. The boss 20a can be a blind or closed boss, as shown, or can have a hole 22 the same as boss 20. The pressure vessel 10 can be made requiring only one boss 20, if desired (not shown).

The biasable interface material layer 25 is preferably natural or synthetic elastomer or thermo-plastic made from materials including chlorobutyl rubber, butyl rubber, natural styrene, silicone rubber, polyvinylchloride, polyisoprene, polybutadiene, nitrile but not limited thereto. The biasable interface material layer 25 may be characterized as being resilient and having an elastic shear strain limit greater than 10% and having a low modulus of elasticity of less than 300,000 psi and preferable in the range of from 500 psi to 5,000 psi. The thickness of the interface layer 25 is determined by the maximum pressure that the vessel 10 will be subjected to. The material of the interface layer 25 is selected from a candidate material that has a low permeation factor with respect to the fluid to be stored in the vessel, that is chemically compatible with the fluid and that has the required upper and lower temperature properties for the particular application.

The outer layer 13 is bonded to the inner liner 14 usually by an adhesive. The adhesive used to bond the interface layer 25 to the flange surface 24a and the liner surface 14a can be the same adhesive used between the layer 13 and the liner 14 or another adhesive, as desired (and well known to those skilled in the art).

Now referring to FIG. 3, a segmented portion of the vessel 10, similar to FIG. 2, is depicted when the vessel 10 is pressurized. The double arrows A indicated the force created by pressurization of the vessel 10. When the vessel 10 is in the pressurized mode, the composite housing 12 tends to pull away from the boss 20 as indicated by the arrow C and the gap created adjacent the semi-cylindrical portion 26. The interface layer 25 is in a shear mode as indicated by the arrows B. However, it is believed that the layer 25 is also subjected to a compressive force created by force A thereby offsetting some of the shear force C.

Thus, in a preferred embodiment of this invention, so described, the boss 20 can be made of a material that is different than the metal liner, if desired. For example, when the liner 14 is aluminum the boss 20 can be made from stainless steel which cannot be satisfactorily welded, brazed or soldered to the aluminum liner. Alternatively, the boss 20 can be made from strong thermosetting plastic materials including polyimides, epoxies, but not limited thereto. Since the boss 20 is relatively thick in cross-section compared to the liner 14 and the outer layer 13, the boss 20 is designed so that the pressure in the vessel 10 never exceeds the plastic strain limit of the boss.

The vessel is first made by inserting and bonding the boss(es) to the metal liner in the manner previously described. The liner-boss assembly is then cured if required by the adhesive used. Next, the liner-boss assembly is coated with adhesive and overwrapped with the resin impregnated material reinforcing layer 13. The total assembly is then finally cured to form the pressure vessel. The general method of manufacturing is well understood by those skilled in art and similar to the disclosure of application for U.S. Letters Patent Ser. No. 144,351 previously referred to and fully incorporated herein by reference. Thus, a pressure vessel so constructed provides a structure that will not shatter or explode (while pressurized) when rapidly punctured such as by a bullet.

In a pressure vessel wherein a metal boss is welded, brazed or soldered to the metal liner extremely high stress concentrations occur at this rigid connection causing premature failure of the pressure vessel. One distinct advantage of this invention resides in the fact that by using a biasable sealing means between the boss 20 and the liner 14 of the housing 12 no high stress concentrations are formed; therefore, such premature failure is substantially eliminated.

As discussed in the BACKGROUND OF THE INVENTION section, the leakage rate for a non-metal lined pressure vessel is, in part, a function of the geometric factor. These non-metal liners are generally made from the same or similar material as the biasable seal interface layer 25. By several examples it can readily be seen that the leakage rate for the invention taught herein is many orders of magnitude less than the prior art non-metal lined pressure vessels of equal size when both are subjected to the same conditions; thus, greatly extending the useful operational storage life of this vessel over the operational storage life of the prior art vessel (if it had any storage life at all). For these comparisons, it is proper to assume from the formula:

$$L_r = K \times \Delta P \times G$$

that K and $\Delta P$ will be constant for any preselected condition. The leakage rate, $L_r$, is then directly proportional to the geometric factor, G, which is the area (A) of the non-metal liner exposed to the fluid stored in the vessel divided by the thickness ($t$) of the liner. More simply expressed $$L_r = K_1 \times G$$

where $K_1$ is the constant $K \times \Delta P$ for preselected conditions.

A prior art pressure vessel having a non-metal liner made from Chlorobuytl rubber has an internal volume of 300 cubic inches, a non-metal liner surface of 243 square inches exposed to the fluid therein and a thickness of 0.060 inch. The geometric factor, G or A/$t$, is 4050. A pressure vessel made in accordance with this invention having an internal volume of 300 cubic inches, has an average exposed surface area of the non-metal biasable seal means of 0.329 square inches. The thickness (length) of the biasable seal means along the flange surface 24a — inner liner surface 14a is 0.842 inches. Since the geometric factor, G or A/$t$ for one boss of this vessel is .391, G for both bosses is .782 which is 5192 times smaller than the geometric factor for the prior art vessel.

In another prior art vessel with an internal volume of 2,550 cubic inches, an internal surface area of 955 square inches and a liner thickness of 0,060 inch has a geometric factor, G or A1/$t_1$ of 15,916. Another vessel made in accordance with this disclosure and which has an internal volume of 2,550 cubic inches, an exposed surface area of the biasable seal means of 1.05 square inches for two bosses and a thickness of 2.255 inches has a geometric factor of G or A/$t$ of .469 which is 33,936 times smaller than the prior art vessel. Since the geometric factor for the new and improved vessels described herein is 5200 to 34,000 times smaller than the prior art vessels, then the leakage rate is also 5,200 to 34,000 times smaller than the prior art vessels' leakage rates. Thus, the striking advantage of these pressure vessels over the prior art vessels is obvious.

Although specific embodiments of the invention have been described, many modifications and changes may be made in the structure and configuration of the pressure vessel and in the materials used to make the desired pressure vessel, without departing from the spirit and scope of the invention as defined in the appended claim.

We claim:
1. A pressure vessel comprising:
   1. a composite structural housing defined by a metal inner liner substantially surrounded by a resin impregnated filament formed reinforcing layer, the housing having a polar end and an opening therein;
   2. a boss having a flange portion mounted within the housing at the polar end opening adjacent a portion of the inner liner;
   3. means providing a resilient low modulus interface biasable seal between the flange portion and the inner liner portion;
   4. said seal permitting relative movement between the housing and the boss while maintaining the seal.
2. The vessel of claim 1 wherein said means comprises, in part, a material having a modulus of elasticity of less than 300,000 psi.
3. The vessel of claim 2 wherein said means comprises an elastomeric material and an adhesive.
4. The vessel of claim 3 wherein said elastomeric material is securely affixed to a portion of the boss and the liner thereby forming high pressure seals therewith.
5. The vessel of claim 2 wherein said means comprises a rubbery polymer and an adhesive.
6. A pressure vessel capable of storing fluids under high pressure for extended periods of time and under repeated cyclic pressurizations and depressurizations comprising:
   1. a composite structural housing defined by a metal liner substantially surrounded by a resin impregnated filament formed reinforcing layer, the housing having a polar end with an opening therein;
   2. a boss having a flange portion thereof located within the housing at the opening adjacent a portion of the metal liner;
   3. a biasable seal located between the metal liner and the boss portion adjacent the metal liner, the seal being resiliently affixed thereto; and
   4. means permitting relative movement between the housing and the boss while maintaining the seal.
7. A pressure vessel comprising:
   1. a composite structural housing defined by a thin metal liner substantially surrounded by a resin impregnated filament formed reinforcing layer, the housing having an opening therein;
   2. a boss having a flange portion thereof within the housing at the opening adjacent a portion of the metal liner; and
   3. means forming a seal and a bias between the boss portion adjacent the metal liner thereby eliminating high stress concentration areas; and
   4. means permitting relative movement between the housing and the boss while maintaining the seal.
8. A pressure vessel comprising:
   1. a metal liner having a polar end with an opening therein;
   2. boss means having a flange portion mounted within the housing adjacent the polar end opening;
   3. means providing a low modulus innerface biasable seal between the boss portion and the housing; and
   4. means permitting relative movement between the housing and the boss while maintaining the seal.
9. A high pressure vessel comprising;
   1. a metal liner having a polar end with an opening therein;
   2. boss means having a flange portion mounted within the housing adjacent the polar opening; and
   3. interface means secured to the boss and housing to provide a seal therebetween and to permit relative movement therebetween when the vessel is cyclicly pressurized and depressurized.

* * * * *